UNITED STATES PATENT OFFICE.

GEORGE HOLGATE, OF PHILADELPHIA, PENNSYLVANIA.

PROCESS OF PRESERVING MEATS.

SPECIFICATION forming part of Letters Patent No. 312,995, dated February 24, 1885.

Application filed January 10, 1885. (No specimens.)

*To all whom it may concern:*

Be it known that I, GEORGE HOLGATE, of the city and county of Philadelphia, Pennsylvania, have invented Improvements in the Preservation of Meats, of which the following is a specification.

In the ordinary preparation of meats for the market, whether intended for immediate consumption or to be preserved by any of the usual processes, it has always been the custom, after slaughtering the animal, to deposit the carcass in a refrigerator and to expose it to a low temperature for from one to three weeks before putting it upon the market or subjecting it to the preservative treatment. This treatment is attended with a considerable expense, not only arising from the cost of constructing and using the refrigerating apparatus, but also from the delay and the handling and transportation of the meat. This treatment of the meat is also prejudicial to its subsequent treatment by gases with the object of preserving the same, inasmuch as the meat becomes oxidized by contact with the air, and as it shrinks in cooling, so that the preservative gases will not penetrate the same so thoroughly as they otherwise might, and as the coating formed upon the surfaces tends to resist the action of the gases. I have overcome these objections in the ordinary modes of preparation and treatment by subjecting the meat while retaining the animal heat and without preliminary refrigeration to a direct action of preservative gases so applied as to cool the meat simultaneously with the exertion of their preservative action.

In carrying out my mode of treatment I employ any suitable tank or chamber having an opening for the admission and withdrawal of the meat, capable of being made practically air-tight, and with openings whereby the air may be exhausted to form a vacuum and for the admission of the preservative agent or agents. The meat, immediately after the animal is slaughtered, is deposited within the tank, the latter is sealed, and the air is exhausted to as great an extent as possible. By thus exhausting the air from the meat while the latter is warm from the animal heat the pores are opened or distended to a much greater extent than is possible by treatment in a vacuum after the meat has become cooled. After the exhaustion of the air the preservative agent is introduced into the chamber, or the latter is put in communication with a chamber containing it, in such manner that the expansion of the said agent will result in a rapid extraction of the heat and a corresponding reduction of the temperature of the meat.

I have found in practice that the most effective agent is sulphurous anhydride or sulphurous-acid gas ($SO_2$) which is in a liquid or crystalline condition at the time that it is introduced into the chamber or put into communication therewith, and which immediately expands, rapidly absorbs the heat, and creates such a low temperature that the meat is thoroughly chilled and the animal heat wholly extracted in the course of a very few minutes, but not so quickly as to prevent the gas from penetrating the pores and acting upon the entire body of the meat.

Inasmuch as the meat is treated immediately after the slaughter of the animal, the surfaces are in their natural condition without being obstructed by any coating or film, and the gas can act upon the same and penetrate the body of the meat much more effectively than would be possible in treating meats that have been subjected for any considerable time to the action of atmospheric air.

I have found that by treating the meat with anhydrous sulphurous gas a much better preservative effect is secured, the presence of even a small quantity of water being objectionable.

After the treatment with the sulphurous anhydride I introduce carbonic-acid gas, which has the effect of further lowering the temperature, and so co-operates with the sulphurous gas as to improve the preservative action upon the meat, so that when the latter is withdrawn from the chamber (which may be done after an exposure of about thirty minutes) it may be exposed to the atmosphere for many months without deterioration, or without in any way impairing its qualities. By this treatment I not only impart to the meat such qualities as will permit its exposure to the atmospheric air without deterioration, but I also avoid the expense and trouble incident to the preliminary refrigeration and its maintenance at a low temperature for a great length of time.

It will be apparent that the preservative gas for the purposes of this invention must be in a condensed form, which may result from compression more or less than is required to produce liquefaction or crystallization, so that it will expand in the presence of the meat to produce a refrigerative effect.

Without limiting myself to the precise mode of operation herein set forth, I claim—

1. The mode of treating meats to simultaneously cool and preserve the same, consisting in introducing them while retaining the animal heat into a chamber, exhausting the air therefrom, then introducing gaseous preservative in a liquefied or crystalline form into the chamber, and allowing it to expand therein and at one and the same time cool and preserve the meat, then removing the meat to the external atmosphere, substantially as set forth.

2. In the preservation of meats, subjecting the same immediately after slaughter, in a chamber from which the air has been withdrawn, to the action of liquefied or crystalline sulphurous anhydride expanded in the presence of the meat, and to carbonic-acid gas, and then removing the meat after it is cool and exposing it to the atmosphere until desired for use, substantially as specified.

In testimony whereof I have signed my name to this specification in the presence of two subscribing witnesses.

GEORGE HOLGATE.

Witnesses:
 CHARLES E. FOSTER.
 F. L. FREEMAN.